US007577501B2

(12) United States Patent
Tafs et al.

(10) Patent No.: US 7,577,501 B2
(45) Date of Patent: Aug. 18, 2009

(54) METHODS AND SYSTEMS FOR AUTOMATICALLY TRACKING INFORMATION DURING FLIGHT

(75) Inventors: William D. Tafs, Seattle, WA (US); John C. Griffin, III, Seattle, WA (US)

(73) Assignee: The Boeing Company, Chicago, IL (US)

( * ) Notice: Subject to any disclaimer, the term of this patent is extended or adjusted under 35 U.S.C. 154(b) by 495 days.

(21) Appl. No.: 10/787,644

(22) Filed: Feb. 26, 2004

(65) Prior Publication Data

US 2005/0192717 A1 Sep. 1, 2005

(51) Int. Cl.
*G06F 17/00* (2006.01)

(52) U.S. Cl. ............................... 701/14; 701/3; 701/35; 709/206; 434/30

(58) Field of Classification Search ..................... 701/3, 701/35; 340/971; 709/206; 434/29, 30; *G06F 17/00*
See application file for complete search history.

(56) References Cited

U.S. PATENT DOCUMENTS

| | | | | |
|---|---|---|---|---|
| 3,191,147 | A | | 6/1965 | Majendie |
| 3,696,671 | A | | 10/1972 | Steigleder et al. |
| 4,147,056 | A | | 4/1979 | Muller |
| 4,196,474 | A | | 4/1980 | Buchanan et al. |
| 4,212,064 | A | | 7/1980 | Forsythe |
| 4,224,669 | A | | 9/1980 | Brame |
| 4,247,843 | A | | 1/1981 | Miller |
| 4,274,096 | A | | 6/1981 | Dennnison |
| 4,325,123 | A | | 4/1982 | Graham |
| 4,424,038 | A | | 1/1984 | Tingleff et al. |
| 4,471,439 | A | | 9/1984 | Robbins et al. |
| H139 | H | | 10/1986 | Task |
| 4,631,678 | A | | 12/1986 | Angermuller et al. |
| 4,642,775 | A | * | 2/1987 | Cline et al. ................. 701/200 |
| 4,729,102 | A | * | 3/1988 | Miller et al. .................. 701/14 |
| 4,792,906 | A | | 12/1988 | King |
| 4,860,007 | A | | 8/1989 | Konicke |
| 4,939,661 | A | | 7/1990 | Barker et al. |

(Continued)

FOREIGN PATENT DOCUMENTS

DE 3315386 A 10/1984

(Continued)

OTHER PUBLICATIONS

International Search Report and Writtten Opinion for PCT/US2005/005469; Applicant: The Boeing Company; Apr. 18, 2005; (11 pgs).

(Continued)

*Primary Examiner*—Tuan C To
(74) *Attorney, Agent, or Firm*—Perkins Coie LLP

(57) ABSTRACT

Methods and systems for automatically tracking information during flight are disclosed. A method in accordance with one embodiment of the invention includes receiving first information corresponding to a proposed aspect of a flight of the aircraft and including at least one target value. The method can further include automatically receiving second information that includes an actual value corresponding to the at least one target value, as the aircraft executes the flight. The at least one target value and the actual value can be provided together in a common computer-based medium.

30 Claims, 8 Drawing Sheets

U.S. PATENT DOCUMENTS

| | | | | |
|---|---|---|---|---|
| 5,050,081 | A | 9/1991 | Abbott et al. | |
| 5,053,967 | A * | 10/1991 | Clavelloux et al. | 701/14 |
| 5,070,458 | A | 12/1991 | Gilmore et al. | |
| 5,072,218 | A | 12/1991 | Spero et al. | |
| 5,243,339 | A | 9/1993 | Graham et al. | |
| 5,283,643 | A * | 2/1994 | Fujimoto | 348/143 |
| 5,289,185 | A | 2/1994 | Ramier et al. | |
| 5,329,277 | A | 7/1994 | Dougan et al. | |
| 5,337,982 | A | 8/1994 | Sherry | |
| 5,416,705 | A | 5/1995 | Barnett | |
| 5,420,582 | A | 5/1995 | Kubbat | |
| 5,454,074 | A | 9/1995 | Hartel | |
| 5,475,594 | A | 12/1995 | Oder et al. | |
| 5,499,025 | A | 3/1996 | Middleton et al. | |
| 5,508,928 | A | 4/1996 | Tran | |
| 5,519,392 | A | 5/1996 | Oder et al. | |
| 5,523,949 | A | 6/1996 | Agate et al. | |
| 5,668,542 | A | 9/1997 | Wright | |
| 5,715,163 | A | 2/1998 | Bang | |
| 5,736,955 | A | 4/1998 | Roif | |
| 5,739,769 | A | 4/1998 | Vladimir | |
| 5,798,712 | A | 8/1998 | Coquin et al. | |
| 5,802,492 | A | 9/1998 | DeLorme et al. | |
| 5,844,503 | A | 12/1998 | Riley et al. | |
| 5,875,998 | A | 3/1999 | Gleine | |
| 5,884,219 | A | 3/1999 | Curtwright et al. | |
| 5,916,297 | A | 6/1999 | Griffin, III et al. | |
| 5,940,013 | A | 8/1999 | Vladimir et al. | |
| 5,941,930 | A | 8/1999 | Morimoto et al. | |
| 5,971,318 | A | 10/1999 | Lustre | |
| 5,978,715 | A | 11/1999 | Briffe | |
| 5,983,158 | A | 11/1999 | Suzuki et al. | |
| 5,995,290 | A | 11/1999 | Noble | |
| 5,995,901 | A | 11/1999 | Owen et al. | |
| 6,038,498 | A | 3/2000 | Briffe et al. | |
| 6,057,786 | A | 5/2000 | Briffe | |
| 6,067,502 | A | 5/2000 | Hayashida et al. | |
| 6,072,473 | A | 6/2000 | Muller et al. | |
| 6,075,467 | A | 6/2000 | Ninagawa et al. | |
| 6,085,129 | A | 7/2000 | Schardt | |
| 6,098,014 | A | 8/2000 | Kranz | |
| 6,112,141 | A | 8/2000 | Briffe | |
| 6,118,385 | A | 9/2000 | Leard | |
| 6,154,151 | A | 11/2000 | McElreach et al. | |
| 6,175,315 | B1 | 1/2001 | Millard et al. | |
| 6,181,987 | B1 | 1/2001 | Deker et al. | |
| 6,188,937 | B1 | 2/2001 | Sherry | |
| 6,246,320 | B1 | 6/2001 | Monroe | |
| 6,262,720 | B1 | 7/2001 | Jeffrey | |
| 6,278,913 | B1 | 8/2001 | Jiang | |
| 6,313,759 | B1 | 11/2001 | Musland-Sipper | |
| 6,314,366 | B1 | 11/2001 | Farmakis et al. | |
| 6,314,370 | B1 * | 11/2001 | Curtright | 701/213 |
| 6,335,694 | B1 * | 1/2002 | Beksa et al. | 340/945 |
| 6,346,892 | B1 | 2/2002 | DeMers et al. | |
| 6,362,750 | B1 | 3/2002 | Castor | |
| 6,381,519 | B1 | 4/2002 | Snyder | |
| 6,381,538 | B1 | 4/2002 | Robinson et al. | |
| 6,389,333 | B1 | 5/2002 | Hansman | |
| 6,405,975 | B1 | 6/2002 | Sankrithi et al. | |
| 6,424,909 | B2 | 7/2002 | Kusano et al. | |
| 6,443,399 | B1 | 9/2002 | Yount et al. | |
| 6,449,556 | B1 | 9/2002 | Pauly | |
| 6,466,235 | B1 | 10/2002 | Smith et al. | |
| 6,473,675 | B2 | 10/2002 | Sample | |
| 6,512,527 | B1 | 1/2003 | Barber et al. | |
| 6,522,958 | B1 * | 2/2003 | Dwyer et al. | 701/3 |
| 6,542,796 | B1 | 4/2003 | Gibbs et al. | |
| 6,556,902 | B2 | 4/2003 | Ing | |
| 6,606,563 | B2 | 8/2003 | Corcoran, III | |
| 6,633,810 | B1 | 10/2003 | Qureshi et al. | |
| 6,636,786 | B2 | 10/2003 | Partel | |
| 6,668,215 | B2 | 12/2003 | Lafon et al. | |
| 6,690,299 | B1 | 2/2004 | Suiter | |
| 6,696,980 | B1 * | 2/2004 | Langner et al. | 340/971 |
| 6,697,718 | B2 | 2/2004 | Le Draoullec et al. | |
| 6,707,387 | B2 | 3/2004 | Noguchi et al. | |
| 6,711,475 | B2 | 3/2004 | Murphy | |
| 6,720,891 | B2 | 4/2004 | Chen et al. | |
| 6,745,113 | B2 | 6/2004 | Griffin, III et al. | |
| 6,753,891 | B1 | 6/2004 | Chohan et al. | |
| 6,784,869 | B1 | 8/2004 | Clark et al. | |
| 6,812,858 | B2 | 11/2004 | Griffin, III | |
| 6,856,864 | B1 | 2/2005 | Gibbs et al. | |
| 6,870,490 | B2 | 3/2005 | Sherry et al. | |
| 6,871,124 | B1 | 3/2005 | McElreath | |
| 6,898,492 | B2 * | 5/2005 | de Leon et al. | 701/35 |
| 6,909,967 | B2 | 6/2005 | Hirano et al. | |
| 6,927,782 | B2 | 8/2005 | Coldefy et al. | |
| 6,934,608 | B2 | 8/2005 | Qureshi | |
| 6,980,198 | B1 | 12/2005 | Gyde et al. | |
| 7,030,892 | B1 | 4/2006 | Gyde et al. | |
| 7,072,746 | B1 * | 7/2006 | Burch | 701/14 |
| 7,181,478 | B1 * | 2/2007 | Korson et al. | 707/204 |
| 7,188,007 | B2 | 3/2007 | Boorman | |
| 7,222,017 | B2 | 5/2007 | Clark et al. | |
| 7,321,318 | B2 | 1/2008 | Crane et al. | |
| 7,363,119 | B2 | 4/2008 | Griffin, III et al. | |
| 2002/0004695 | A1 * | 1/2002 | Glenn et al. | 701/35 |
| 2002/0016654 | A1 | 2/2002 | Ing et al. | |
| 2002/0033837 | A1 | 3/2002 | Munro | |
| 2002/0035416 | A1 * | 3/2002 | De Leon | 701/14 |
| 2002/0099528 | A1 | 7/2002 | Hett | |
| 2003/0025719 | A1 | 2/2003 | Palmer et al. | |
| 2003/0058134 | A1 | 3/2003 | Sherry | |
| 2003/0132860 | A1 | 7/2003 | Feyereisen | |
| 2003/0135311 | A1 * | 7/2003 | Levine | 701/35 |
| 2003/0225492 | A1 * | 12/2003 | Cope et al. | 701/35 |
| 2004/0004557 | A1 | 1/2004 | Sikora | |
| 2004/0006412 | A1 | 1/2004 | Doose et al. | |
| 2004/0059474 | A1 | 3/2004 | Boorman | |
| 2004/0095466 | A1 * | 5/2004 | Galasso | 348/143 |
| 2004/0104824 | A1 * | 6/2004 | Cole et al. | 340/971 |
| 2004/0111192 | A1 * | 6/2004 | Naimer et al. | 701/9 |
| 2004/0128039 | A1 * | 7/2004 | Podowski | 701/35 |
| 2004/0183697 | A1 | 9/2004 | Rogers et al. | |
| 2004/0230352 | A1 * | 11/2004 | Monroe | 701/3 |
| 2004/0254691 | A1 | 12/2004 | Subelet | |
| 2005/0005065 | A1 * | 1/2005 | Rowlan | 711/115 |
| 2005/0178903 | A1 | 8/2005 | Boorman et al. | |
| 2005/0182528 | A1 | 8/2005 | Dwyer et al. | |
| 2005/0203676 | A1 | 9/2005 | Sandell et al. | |
| 2005/0222721 | A1 | 10/2005 | Chen et al. | |
| 2005/0228674 | A1 | 10/2005 | Gunn et al. | |
| 2005/0231390 | A1 | 10/2005 | Crane et al. | |
| 2005/0283305 | A1 | 12/2005 | Clark et al. | |
| 2006/0004496 | A1 | 1/2006 | Tucker et al. | |
| 2006/0004498 | A1 | 1/2006 | Gunn et al. | |
| 2006/0005147 | A1 | 1/2006 | Hammack et al. | |
| 2006/0220914 | A1 | 10/2006 | Sikora et al. | |

FOREIGN PATENT DOCUMENTS

| | | | |
|---|---|---|---|
| EP | 0 286 120 | | 10/1988 |
| EP | 0 370 640 | | 5/1990 |
| EP | 0 489 521 | | 6/1992 |
| EP | 1273987 | | 1/2003 |
| FR | 2817831 | | 6/2002 |
| FR | 2848306 | | 6/2004 |
| GB | 886136 | | 1/1962 |
| JP | 05338594 | A * | 12/1993 |
| WO | WO-02/24530 | | 3/2002 |

WO WO-2004/027732 4/2004

OTHER PUBLICATIONS

Painter et al., "Decision Support For the General Aviation Pilot," Systems, Man, and Cybernetics, IEEE International Conference on Computational Cybernetics and Simulation, Orlando, FL, Oct. 12-15, 1997, pp. 88-93.
NASA, F-18 Cockpit, 1995, <http://www.dfrc.nasa.gov/gallery/Photo/F-18Chase/Medium/EC95-43155-7.jpg>, accessed Aug. 14, 2007.
Deltasoft, F-15 Cockpit, Aug. 2001, <http://web.archive.org/web/20010803031953/http://deltasoft.fife.wa.us/cockpit.htm> accessed Aug. 14, 2007.
U.S. Appl. No. 10/746,883, Boorman.
U.S. Appl. No. 10/746,912, Boorman.
U.S. Appl. No. 10/798,749, Sandell et al.
777 Flight Deck (1 page); http://www.meriweather.com/777/777_main.html [Accessed Jan. 28, 2003].
Hutchins, Edwin, "The Integrated Mode Management Interface," Department of Cognitive Science, University of California, San Diego, Sep. 17, 1996.
Lindenfeld, "What is an FMS?", Flight Management Systems (5 pages); http://www.ultranet.com/~marzgold/FAQ-FMS.html [Accessed Jun. 3, 2002].
Meriweather's Flight Deck Acronyms & Definitions (4 pages); http://www.meriweather.com/fd/def.html; [Accessed Jun. 3, 2002].
Peugeot 406 Handbook, Automobiles Peugeot, Paris, France, May 14, 1998 (pp. 30 and 38).

* cited by examiner

331

432a

| | | | FCST | ACT |
|---|---|---|---|---|
| DEPARTURE AIRPORT | WMSA | OUT TIME<br>OFF TIME | 0738<br>0750 | |
| DESTINATION AIRPORT | PHKO | ON TIME<br>IN TIME | 2010<br>2015 | |
| ALTERNATE AIRPORT | PHTO | | | |

432b

| | | FCST | ACT | FCST | ACT | | | | | | | | | | |
|---|---|---|---|---|---|---|---|---|---|---|---|---|---|---|---|
| WPT<br>FRQ | FL<br>TRO | T<br>TDV | T<br>TDV | WIND<br>COMP | WIND<br>COMP | TAS<br>GS | CRS<br>HDG | ARWY<br>MSA | DIS<br>DISR | ETE<br>ATE | ETE<br>ATA | +/- | ZFU<br>EFR | FFE<br>AFR | +/- |
| JOM<br>116.7 | 370<br>54 | 46<br>P11 | | 08026<br>M024 | | 502<br>478 | 107<br>106 | TR27<br>095 | 039<br>4759 | 0004 | 1108 | | 0008<br>0894 | 02360 | |
| DILIS | 370<br>54 | 46<br>P11 | | 09023<br>M023 | | 502<br>479 | 094<br>094 | G467<br>074 | 214<br>4545 | 0027 | 1135 | | 0042<br>0852 | 02337 | |

432b

*Fig. 4*

331

432a

| | | | | |
|---|---|---|---|---|
| DEPARTURE AIRPORT | WMSA | OUT TIME<br>OFF TIME | 0738<br>0750 | **0740**<br>**0751** |
| DESTINATION AIRPORT | PHKO | ON TIME<br>IN TIME | 2010<br>2028 | **2013**<br>**2028** |
| ALTERNATE AIRPORT | PHTO | | | |

432b

| | | FCST | ACT | FCST | ACT | | | | | | | | | | |
|---|---|---|---|---|---|---|---|---|---|---|---|---|---|---|---|
| WPT<br>FRQ | FL<br>TRO | T<br>TDV | T<br>TDV | WIND<br>COMP | WIND<br>COMP | TAS<br>GS | CRS<br>HDG | ARWY<br>MSA | DIS<br>DISR | ETE<br>ATE | ETE<br>ATA | +/- | ZFU<br>EFR | FFE<br>AFR | +/- |
| JOM<br>116.7 | 370<br>54 | 46<br>P11 | **48**<br>**P13** | 08026<br>M024 | **08020**<br>**M020** | 502<br>478 | 107<br>106 | TR27<br>095 | 039<br>4759 | 0004<br>**0004** | 1108<br>**1108** | **0** | 0008<br>0894 | 02360<br>**85.8** | **-3.6** |
| DILIS | 370<br>54 | 46<br>P11 | **45**<br>**P10** | 09023<br>M023 | **09020**<br>**M020** | 502<br>479 | 094<br>094 | G467<br>074 | 214<br>4545 | 0027<br>**0025** | 1135<br>**1133** | **-2** | 0042<br>0852 | 02337<br>**83.4** | **-3.3** |

*Fig. 5*

880

| | TIME | POSITION | TIME | POSITION | TIME | POSITION |
|---|---|---|---|---|---|---|
| | 1840.0z | N4900.1W08500.5 | 1945.0z | N4900.1W07004.7 | 2030.0z | N4900.1W05922.5 |
| ALTIMETER L | 25002.1 | | 29001.9 | | 33000.1 | |
| ALTIMETER C | 25000.0 | | 29000.5 | | 33000.9 | |
| ALTIMETER R | 25001.0 | | 29001.0 | | 33001.5 | |

*Fig. 8*

980

| TIME | EVENT |
|---|---|
| 1840.0z | PASSENGER IN 35E FEELING AIRSICK |
| 1845.0z | CONNECTING FLIGHT B0321 DELAYED AT KLAX 30MIN |
| 1840.0z | ATC CRUISE ALTITUDE RE-CLEARANCE TO FL410 |
| 1855.0z | ATC OCEANIC TRACK CLEARANCE RECEIVED |
| 1900.0z | COMPANY RE-DISPATCHED TO FINAL DESTINATION |

981

*Fig. 9*

1082

DEPARTURE AIRPORT
SCHEDULED PUSH-BACK TIME
SCHEDULED TAKEOFF TIME
DESTINATION AIRPORT
SCHEDULED LANDING TIME
SCHEDULED ARRIVAL (AT THE GATE) TIME
PAYLOAD WEIGHT
PREDICTED TRIP FUEL
RESERVE FUEL
PREDICTED ARRIVAL FUEL
ACTUAL ARRIVAL FUEL
ALTERNATE AIRPORTS
EQUAL TIME POINT LOCATION FOR MAKING DIVERSION DECISIONS
ALTERNATE AIRPORT INFORMATION, DIVERSION ROUTING
DEPARTURE RUNWAY
DEPARTURE INSTRUMENT PROCEDURE
EN ROUTE FLIGHT PLAN DETAILS
- NAVIGATION POINT NAME
- COURSE
- DISTANCE
- ESTIMATED TIME EN ROUTE
- ESTIMATED TIME OF ARRIVAL
- ESTIMATED FUEL
- ACTUAL TIME EN ROUTE
- ACTUAL TIME OF ARRIVAL
- ACTUAL FUEL

DEPARTURE, EN ROUTE AND TERMINAL WEATHER
NOTICES TO AIRMEN (NOTAMS)

*Fig. 10*

METHODS AND SYSTEMS FOR AUTOMATICALLY TRACKING INFORMATION DURING FLIGHT

TECHNICAL FIELD

The present invention relates generally to methods and systems for automatically tracking information, including navigational information, fuel consumption data, flight plan data and/or system check data during aircraft flight operations.

BACKGROUND

Since the advent of organized flight operations, pilots have been required to maintain an historical record of the significant events occurring during their flights. In the earliest days of organized flight, pilots accomplished this task by writing notes by hand on pieces of paper. Still later, this informal arrangement was replaced with a multiplicity of forms, which the pilot filled out during and after flight. Eventually, the preflight portion of this activity became computerized. For example, computers are currently used to generate preflight and flight planning data in standardized forms. Pilots print out the forms and, for each predicted item of flight data, manually enter a corresponding actual item of flight data. For example, the forms can include predicted arrival and departure times, predicted fuel consumption, and predicted times for overflying waypoints en route. These forms are typically maintained for a minimum of 90 days, at the request of regulatory agencies and/or airlines.

One characteristic of the foregoing approach is that it requires the pilot to manually input "as-flown" data for many parameters identified in a typical flight plan. As a result, the pilot's workload is increased and the pilot's attention may be diverted from more important or equally important tasks. A drawback with this arrangement is that it may not make efficient use of the pilot's limited time.

SUMMARY

The present invention is directed to methods and systems for collecting aircraft flight data. A method in accordance with one aspect of the invention can include receiving first information corresponding to a proposed aspect of a flight of the aircraft, with the first information including at least one target value. The method can further include automatically receiving second information that includes an actual value corresponding to the at least one target value, as the aircraft executes the flight. The at least one target value and the actual value can be provided together in a common computer-based medium. For example, the at least one target value and the actual value can be provided in a printable electronic file, a printout, a computer-displayable file, a graphical representation, or via a data link.

A system in accordance with an embodiment of the invention can include a first receiving portion configured to receive first information corresponding to a proposed aspect of a flight of the aircraft, the first information including at least one target value. A second receiving portion can be configured to automatically receive second information as the aircraft executes the flight, with the second information including an actual value corresponding to the at least one target value. An assembly portion can be configured to provide the target value and the actual value together in a common computer-based medium.

BRIEF DESCRIPTION OF THE DRAWINGS

FIG. 4 is an illustration of a flight plan table having predicted data in accordance with an embodiment of the invention.

FIG. 5 is an illustration of a flight plan table having predicted data and actual flight data in accordance with an embodiment of the invention.

FIG. 8 is an illustration of a table that includes altimeter calibration data in accordance with an embodiment of the invention.

FIG. 9 is an illustration of a table that includes information input by a flight crew in accordance with an embodiment of the invention.

FIG. 10 illustrates a list of parameters that can be tracked using systems and methods in accordance with embodiments of the invention.

DETAILED DESCRIPTION

The following disclosure describes systems and methods for receiving information proposed for an aircraft flight (e.g., flight plan information) and providing this information along with actual, "as flown" data together in a common medium. Certain specific details are set forth in the following description and in FIGS. 1-12 to provide a thorough understanding of various embodiments of the invention. Well-known structures, systems and methods often associated with these aircraft systems have not been shown or described in detail to avoid unnecessarily obscuring the description of the various embodiments of the invention. Those of ordinary skill in the relevant art will understand that additional embodiments of the present invention may be practiced without several of the details described below.

Many embodiments of the invention described below may take the form of computer-executable instructions, including routines executed by a programmable computer (e.g., a flight guidance computer or a computer linked to a flight guidance computer). Those skilled in the relevant art will appreciate that the invention can be practiced with other computer system configurations as well. The invention can be embodied in a special-purpose computer or data processor that is specifically programmed, configured or constructed to perform one or more of the computer-executable instructions described below. Accordingly, the term "computer" as generally used herein refers to any data processor and includes Internet appliances, hand-held devices (including palm-top computers, wearable computers, cellular or mobile phones, multiprocessor systems, processor-based or programmable consumer electronics, network computers, minicomputers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, as well as distributed electronically over networks. Data structures and transmissions of data particular to aspects of the invention are also encompassed within the scope of the invention.

Figure 1:
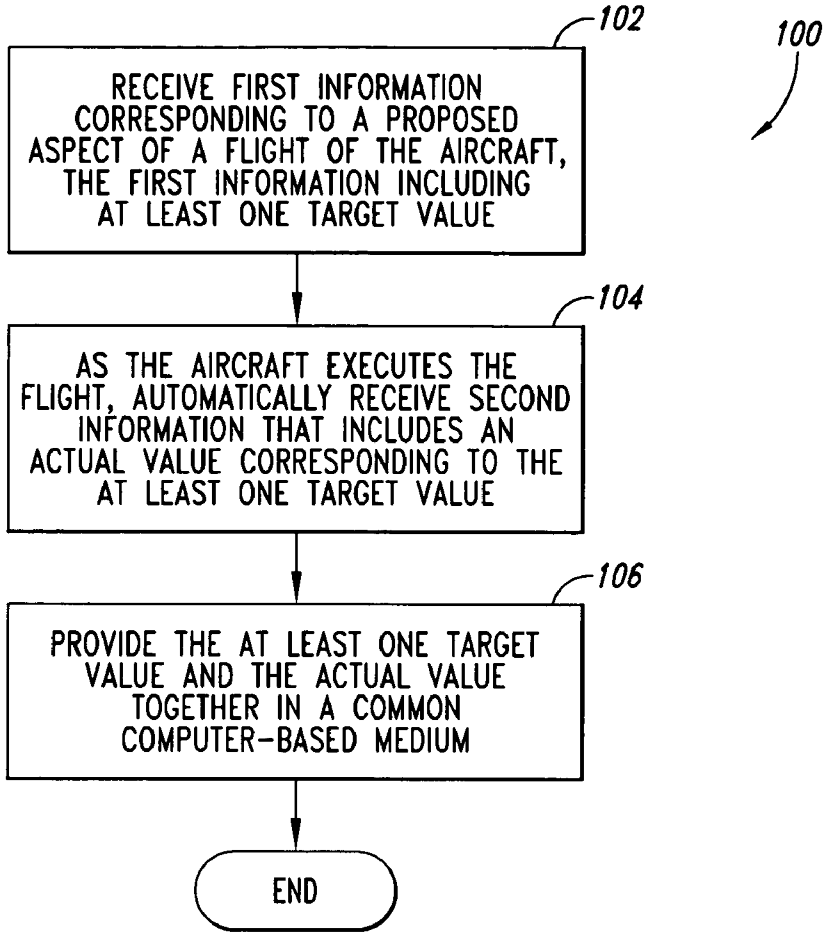
FIG. 1 is a block diagram illustrating a process for receiving and processing information in accordance with an embodiment of the invention.

FIG. 1 is a block diagram illustrating a process 100 for assembling, correlating and presenting information in accordance with an embodiment of the invention. In one aspect of this embodiment, the process 100 includes receiving first information corresponding to a proposed aspect of a flight of an aircraft (process portion 102). The first information can include at least one predicted target value. For example, the first information can include a description of one or more legs of a flight plan, with the target including a destination airport or a waypoint en route to the destination airport. The target for a destination airport can include an identification of the airport, the airport runway, and/or an estimated touchdown time. The target for a waypoint can include a longitude, latitude, altitude and/or estimated arrival time. The flight of the aircraft can encompass aircraft operations prior to takeoff (e.g., outbound taxi maneuvers) and after landing (e.g., inbound taxi maneuvers).

In process portion 104, the process 100 includes automatically receiving second information as the aircraft executes the flight. The second information can include an actual value corresponding to the at least one predicted target value. For example, if the target value includes the latitude, longitude and altitude of a particular waypoint, along with a target time for passing the waypoint, the second information can include the actual latitude, longitude and altitude of the aircraft at its closest approach to the waypoint, along with the time at which the closest approach occurred. The second information can be automatically received, for example, from the aircraft system that generates the second information.

In process portion 106, the at least one target value and the actual value can be provided together in a common, computer-based medium. For example, the first information and the second information can be provided in a computer-readable file or a computer-generated printout. As a result, the operator of the aircraft need not manually input actual flight data corresponding to the predicted flight data. Instead, this information can be automatically provided along with the predicted flight data, which can reduce the operator's workload.

Figure 2:
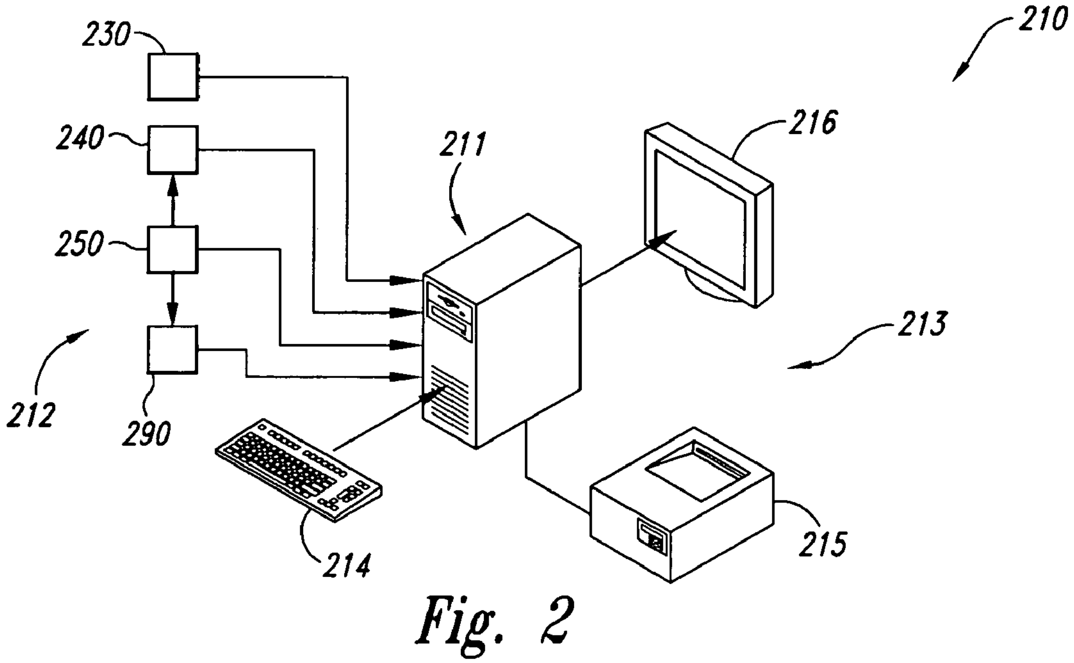
FIG. 2 is a schematic illustration of a system for receiving and processing flight information in accordance with an embodiment of the invention.

FIG. 2 is a schematic illustration of a system 210 configured to carry out processes including the process 100 described above. In one aspect of an embodiment shown in FIG. 2, the system 210 includes a processor 211 that receives predicted an actual inputs from input devices 212 and distributes assembled output to output devices 213. For example, the processor can receive the first (e.g., predicted) information described above with reference to FIG. 1 from a flight guidance computer 230 or other computers and systems 240. The flight guidance computer 230 can receive information from other computers, (e.g., with a ground-based data link provided by a dispatcher or air traffic control) or from the operator. The processor 211 can receive the second (e.g., actual) information described above from sensors 250 (via a navigation system 290 and/or the other systems 240), and/or directly from an operator via a keyboard 214 or other input device. The processor 211 can assemble the information and provide the assembled information for access by the operator and/or other personnel associated with aircraft operations. For example, the processor 211 can display the information on a display unit 216, print the information on a printer 215, store the information on computer-readable media and/or direct the information to another system. Further aspects of these operations are described below with reference to FIGS. 3-12.

Figure 3:
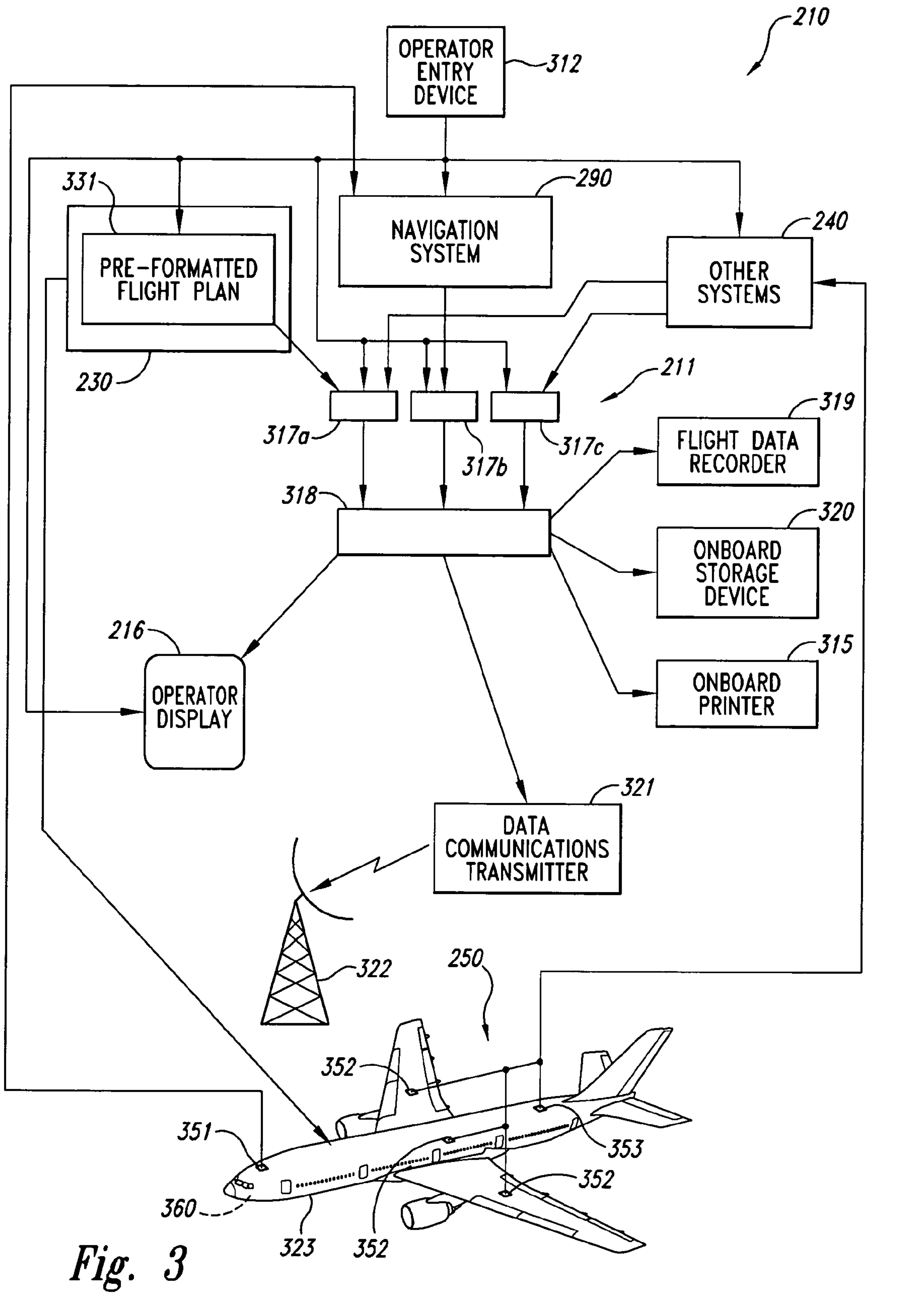
FIG. 3 is a block diagram of an embodiment of the system shown in FIG. 2.

Referring now to FIG. 3, the system 210 can be carried by an aircraft 323 and can include one or more information receivers 317 (three are shown in FIG. 3 as a first receiver 317*a*, a second receiver 317*b* and a third receiver 317*c*) for receiving the predicted and actual information. In other embodiments, the processor 211 (FIG. 2) or other portions of the system 210 can include more receivers (for example, if the functions provided by the receivers are further divided) or fewer receivers (for example, if the functions are consolidated). In a particular aspect of an embodiment shown in FIG. 3, the first receiver 317*a* can receive first (e.g., predicted) information from a pre-formatted flight plan list 331, which can be generated by and/or reside on the flight guidance computer 230. The second receiver 317*b* can receive second (e.g., actual) information from the navigation system 290, the other systems 240, and/or directly from an operator via an operator entry device 312. The third receiver 317*c* can receive third information (e.g., actual flight information that does not necessarily correspond to predicted values) from the other systems 240 and/or the operator. In any of these embodiments, the receiver(s) 317 can include computer-based routines that can access and retrieve the predicted and actual data.

An assembler 318 can assemble some or all of the information obtained by the receivers 317 and provide the assembled information to output devices. For example, the assembler 318 can provide information to the operator display 216 (for operator access) and/or to a flight data recorder 319 for access by investigators or other personnel in the event of an aircraft mishap. The assembled information can also be stored on an onboard storage device 320, for example, as file structured data or non-file structured data on a magnetic or optical computer-readable medium. The information stored on the computer-readable medium can be printed onboard the aircraft with an onboard printer 315, and/or the information can be printed off-board the aircraft. Some or all of the foregoing output devices can be housed in a flight deck 360 of the aircraft 323. In still another embodiment, the information can be routed to a communications transmitter 321 and directed offboard the aircraft, for example, to a ground-based receiver 322. The information received at the ground-based receiver 322 can then be routed to an appropriate end destination, for example, an airline or regulatory agency.

At least some of the second (e.g., actual) information described above can be obtained and provided to the receivers 317 automatically. Accordingly, the aircraft sensors 250 can detect information during the operation of the aircraft and provide this information for comparison to predicted data. In a particular aspect of this embodiment, the sensors 250 can include navigation sensors 351 (for example, gyroscopes and GPS sensors that determine the location and speed of the aircraft), chronometers (that determine the time elapsed between points along the aircraft's route), compasses (that determine the aircraft's heading), and/or altimeters (that determine the aircraft's altitude). Fuel sensors 352 can determine the amount of fuel onboard the aircraft and/or the rate at which the fuel is being consumed. Other sensors 353 can be used to detect other characteristics of the aircraft during operation, for example, the weight of the aircraft and the outside air temperature.

In some embodiments, some of the second information can be provided to the processor 211 by the operator via the operator entry device 312, as described in greater detail below with reference to FIG. 9. In still further embodiments, the operator can use the operator entry device 312 to authorize the operation of the processor 211 at selected points during the flight. In still further embodiments, the operator entry device 312 can be used to provide not only the second information but also the first information. For example, the operator entry device 312 can be used to update the flight plan list 331 and/or other aspects of the aircraft's proposed flight.

FIG. 4 is an illustration of a flight plan list 331 configured in accordance with an embodiment of the invention, prior to execution of a flight. In one aspect of this embodiment, the flight plan list 331 can include an airport list 432*a* and an en route list 432*b*. The airport list 432*a* can include the identification of the departure airport, destination airport, and alternate destination airport. The airport list 432*a* can also list projected or forecast (identified as "FCST") gate, departure time, lift-off time, touchdown time and gate arrival time. Corresponding actual data (identified as "ACT") are described below with reference to FIG. 5.

The en route list 432*b* can include a vertical listing of waypoints ("WPT") and corresponding frequency ("FRQ"), e.g., for corresponding VOR frequencies. For each waypoint, the en route list 432*b* can include predicted values for flight level altitude ("FL"), tropopause ("TRO"), temperature ("T"), deviation in temperature from a standard day temperature ("TDV"), wind direction and speed ("WIND"), and the component of the wind that is either a headwind or a tailwind ("COMP"). Additional variables can include the true airspeed ("TAS"), ground speed ("GS"), course ("CRS"), heading ("HDG"), airway designation ("ARWY"), minimum safe altitude ("MSA"), distance from previous waypoint ("DIS"), distance remaining in the flight ("DISR"), estimated time en route from previous waypoint ("ETE"), actual time en route from previous waypoint ("ATE"), estimated time of arrival ("ETA"), actual time of arrival ("ATA"), deviation between estimated and actual times ("±"), fuel used from previous waypoint ("ZFU"), estimated fuel remaining at a waypoint ("EFR"), fuel flow per engine per hour ("FFE"), actual fuel remaining ("AFR"), and deviation between estimated fuel remaining and actual fuel remaining ("±"). As described above with reference to the airport list 432*a*, the en route list 432*b* can include space for actual values of at least some of the foregoing variables.

FIG. 5 illustrates the flight plan list 331, including the airport list 432*a* and the en route list 432*b* after completion of a flight. In particular aspect of this embodiment, the predicted values are identified in the flight plan list 331 in a first manner and the actual values are identified in a second manner. For example, the predicted values can be indicated in regular type and the actual values indicated in bold type. In other embodiments, the differences between the predicted and actual data can be highlighted by other methods, for example, by using different colors or different font sizes. In any of these embodiments, the actual flight data can be recorded on both the airport list 432*a* and the en route list 432*b* automatically, without the operator manually generating this information.

Figure 6:
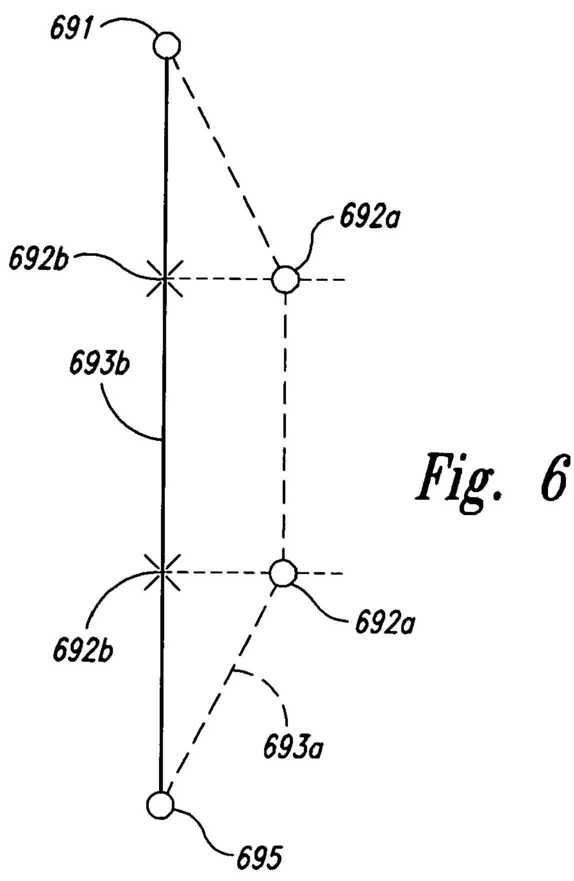
FIG. 6 is a schematic illustration of a method for determining actual flight data corresponding to predicted flight plan data in accordance with an embodiment of the invention.
Figure 7:
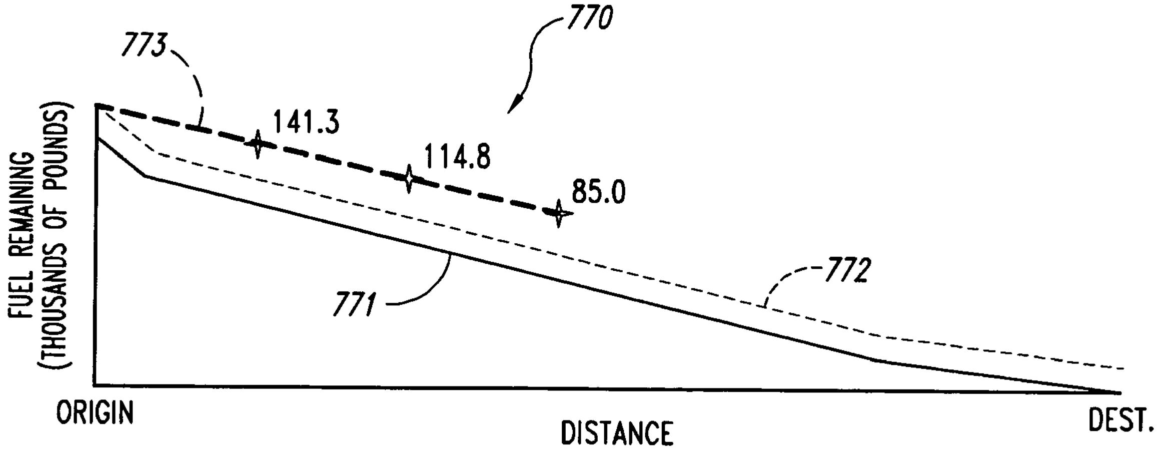
FIG. 7 is an illustration of a graph comparing actual fuel usage with predicted fuel usage in accordance with an embodiment of the invention.

FIG. 6 is a plan view of an aircraft flight route, including a departure point 691, a destination point 695, a proposed flight path 693*a* and an actual flight path 693*b*. The proposed flight path 693*a* passes through two waypoint targets 692*a*, while the actual flight path 693*b* passes through two actual waypoints 692*b*. In one aspect of this embodiment, the actual waypoints 692*b* represent the points along the actual flight path 693*b* that are closest to the waypoint targets 692*a*. Accordingly, each actual waypoint 692*b* can be determined by locating the intersection of a line passing normal to the actual flight path 693*b* and through the corresponding waypoint target 692*a*. In other embodiments, the actual waypoints 692*b* can be determined by other methods. In any of these embodiments, determining the actual waypoint can provide a way for the operator to easily compare the as-flown route with the predicted route.

In one aspect of the embodiments described above, the predicted and actual flight data are presented in tabular format as alphanumeric characters. In other embodiments, these data can be displayed graphically. For example, referring now to FIG. 7, the system 210 described above can generate a fuel consumption graph 770 that compares the actual fuel usage of the aircraft with one or more predicted schedules, both as a function of distance traveled by the aircraft. In a particular embodiment, the fuel consumption graph 770 can include a line 771 corresponding to the predicted fuel usage (assuming the aircraft arrives at its destination with no fuel), and/or a line 772 corresponding to the foregoing predicted fuel usage, plus a reserve. Line 773 identifies the actual fuel used by the aircraft. In one embodiment, the fuel consumption graph 770 can be generated and displayed to the operator en route and/or at the conclusion of the aircraft's flight.

One feature of an embodiment of the arrangement described above with reference to FIG. 7 is that the operator need not manually plot the actual fuel used during flight, and can instead rely on the system 210 (FIG. 2) to do so. An advantage of this feature is that it can reduce the operator's workload. Another advantage of this feature is that it can allow the operator to more easily identify a fault with the fuel system (should one exist), for example, if the actual fuel usage is significantly higher or lower than predicted.

A further advantage of the foregoing feature, in particular, in combination with the actual waypoint calculation feature described above with reference to FIG. 6, is that the operator can easily determine what the aircraft's fuel consumption performance is, even if the aircraft does not follow the proposed flight path. For example, referring now to FIGS. 6 and 7 together, if the aircraft receives a direct clearance between the departure point 691 and the destination point 695, the system 210 can determine the actual fuel used at each actual waypoint 692*b* even though the aircraft may be quite distant from the waypoint targets 692*a*. This information can be obtained and made available to the operator quickly and accurately, without increasing the operator's workload. Accordingly, the operator can more accurately track the fuel usage of the aircraft. This information can be particularly important when determining (a) which airports are within range in case of an in-flight emergency, (b) which airports the aircraft can be rerouted to if ground conditions do not permit landing at the target destination airport, and/or (c) whether a more direct routing can allow the aircraft to skip a scheduled fuel stop.

In other embodiments, the system 210 can collect data corresponding to other aspects of the aircraft's operation. For example, referring now to FIG. 8, the system 210 can generate an altimeter calibration list 880 that identifies altimeter calibration data at a variety of points en route, for example, at waypoints or other locations. In other embodiments, other mandatory and/or operator selected calibration or equipment check data can be tracked automatically by the system 210.

In still further embodiments, the system 210 can be used by the operator to track information that the operator inputs manually. For example, as shown in FIG. 9, the system can generate a flight event list 980 that includes entries 981 made by the operator and corresponding to data that may have no connection with either preplanned, predicted flight information or equipment calibration. Such information can include passenger specific information, connecting flight information, clearance information and other information selectively deemed by the operator to be pertinent, or required by the airline or regulator to be tracked.

FIG. 10 illustrates a sample, non-exhaustive and non-limiting list of variables 1082, many of which have been described above and any or all of which can be tracked by the system 210 described above. In some embodiments, some or all of these items can be selected by an operator to be tracked by the system 210. In other embodiments, the operator can selectively identify other variables for tracking.

Figure 11:
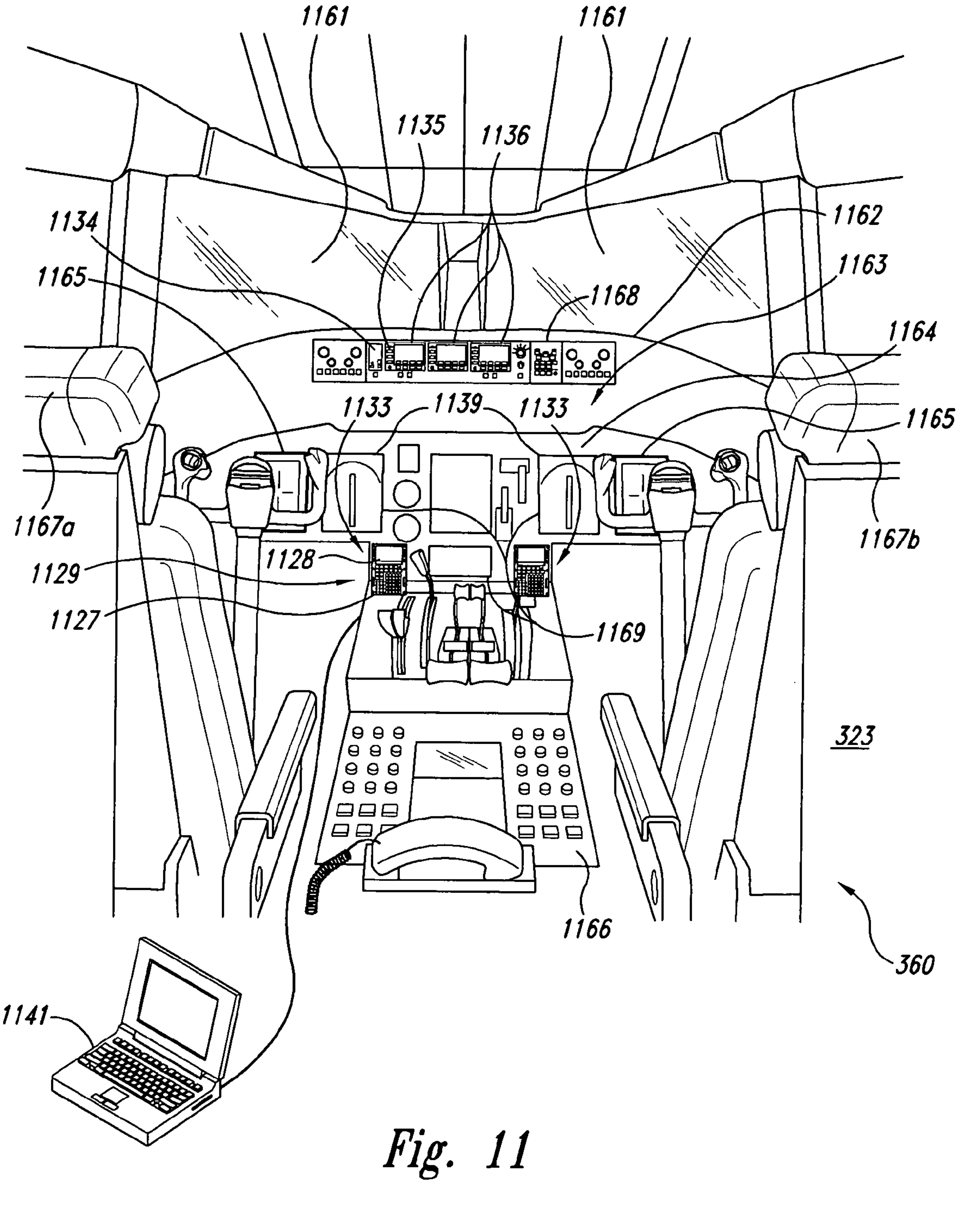
FIG. 11 illustrates a flight deck having systems and displays for carrying out methods in accordance with an embodiment of the invention.

FIG. 11 is a partially schematic, forward looking view of the flight deck 360 described above with reference to FIG. 3, which provides an environment in which the data described above are received and optionally displayed in accordance with an embodiment of the invention. The flight deck 360 can include forward windows 1161 providing a forward field of view out of the aircraft 323 for operators seated in a first seat 1167*a* and/or a second seat 1167*b*. In other embodiments, the forward windows 1161 can be replaced with one or more external vision screens that include a visual display of the forward field of view out of the aircraft 323. A glare shield 1162 can be positioned adjacent to the forward windows 1161 to reduce the glare on one or more flight instruments 1163 positioned on a control pedestal 1166 and a forward instrument panel 1164.

The flight instruments 1163 can include primary flight displays (PFDs) 1165 that provide the operators with actual flight parameter information. The flight deck 360 can also include multifunction displays (MFDs) 1169 which can in turn include navigation displays 1139 and/or displays of other information, for example, the completed flight plan list described above with reference to FIG. 5. The flight plan list can also be displayed at one or more control display units (CDUs) 1133 positioned on the control pedestal 1166. Accordingly, the CDUs 1133 can include flight plan list displays 1128 for displaying information corresponding to upcoming (and optionally, completed) segments of the aircraft flight plan. The CDUs 1133 can be operated by a flight management computer 1129 which can also include input devices 1127 for entering information corresponding to the flight plan segments.

The flight instruments 1163 can also include a mode control panel 1134 having input devices 1135 for receiving inputs from the operators, and a plurality of displays 1136 for providing flight control information to the operators. The operators can select the type of information displayed at least some of the displays (e.g., the MFDs 1169) by manipulating a display select panel 1168. In other embodiments, the information can be displayed and/or stored on a laptop computer 1141 coupled to the flight instruments 1163. Accordingly, the operator can easily download the information to the laptop computer 1141 and remove it from the aircraft after flight. In another embodiment, the data can be automatically downloaded via the data communications transmitter 321 (FIG. 3) or stored on a removable medium, including a magnetic medium and/or an optically scannable medium.

Figure 12:
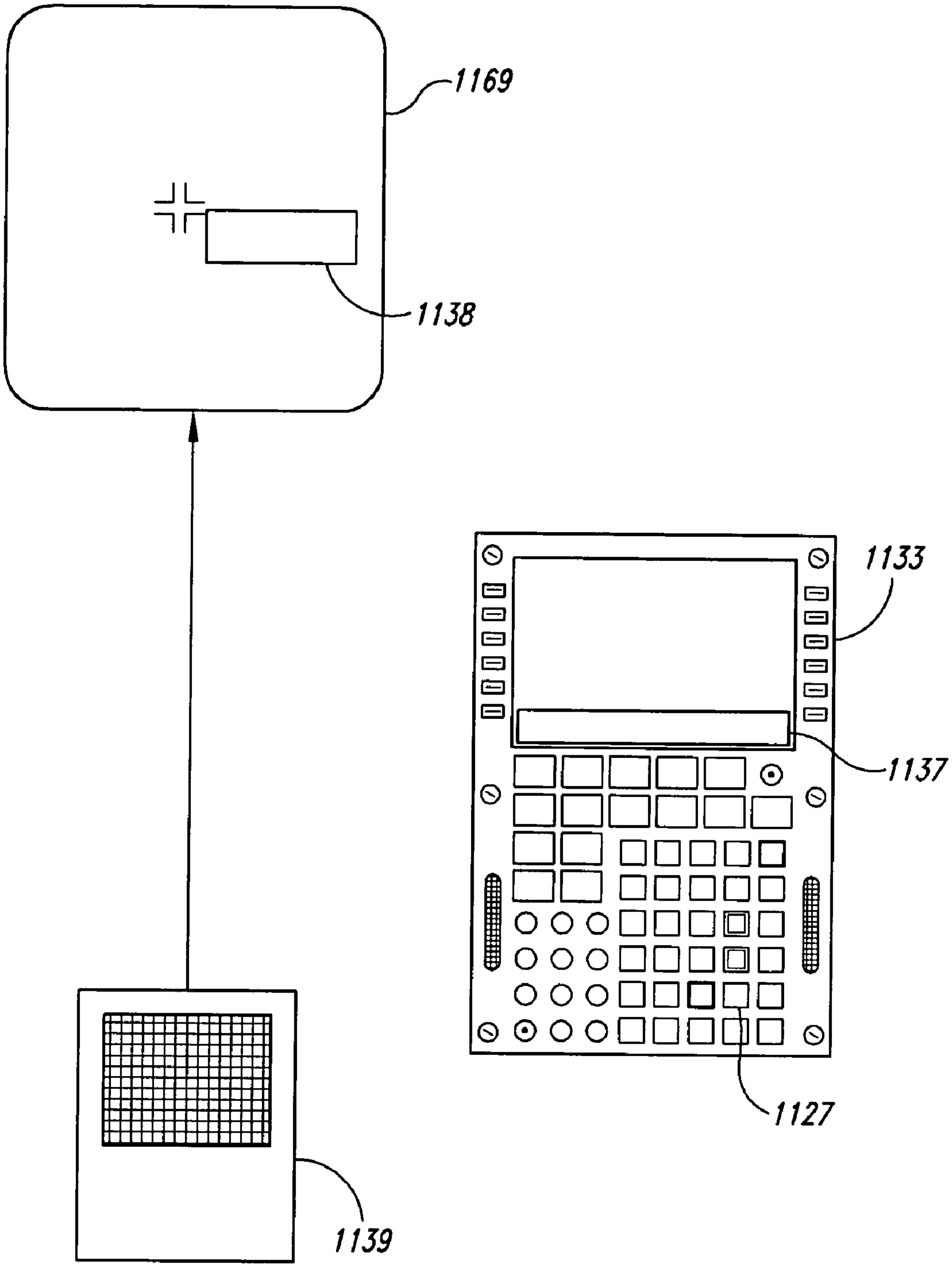
FIG. 12 illustrates a system for obtaining input from an operator in accordance with an embodiment of the invention.

FIG. 12 illustrates one of the CDUs 1133 described above. The CDU can include input devices 1127, such as a QWERTY keyboard for entering data into a scratchpad area 1137. The data can be transferred to another display (e.g., an MFD 1169) or other device by highlighting a destination field 1138 via a cursor control device 1139 (for example, a computer mouse) and activating the cursor control device 1139. In other embodiments, the operator can input information in other manners and/or via other devices.

One feature of the embodiments described above with reference to FIGS. 1-12 is that information that had previously been manually input by the operator of the aircraft (for example, actual, as flown flight data) is instead generated, assembled, and/or provided automatically by an aircraft system. An advantage of this arrangement is that it can reduce operator workload, thereby freeing the operator to spend his or her limited time on potentially more pressing aspects of the aircraft's operation. Accordingly, the overall efficiency with which the operator completes his or her tasks, and/or the accuracy with which such tasks can be improved.

From the foregoing, it will be appreciated that specific embodiments of the invention have been described herein for purposes of illustration, but that various modifications may be made without deviating from the spirit and scope of the invention. For example, aspects of the invention described above in the context of particular embodiments can be combined, rearranged or eliminated in other embodiments. Accordingly, the invention is not limited except as by the appended claims.

We claim:

1. A computer-implemented method for collecting aircraft flight data, comprising:

receiving first information corresponding to a proposed aspect of a flight of the aircraft, the first information including a first target value and a second target value;

as the aircraft executes the flight, automatically receiving at a first time second information that includes a first actual value corresponding to the first target value;

as the aircraft executes the flight, automatically receiving at a second time third information that includes a second actual value corresponding to the second target value;

establishing a stored record of the aircraft's flight by providing and storing the first target value and the first actual value together in a common computer-based medium for use after the aircraft executes the flight;

providing and storing the second target value and the second actual value together in the common computer-based medium for use after the aircraft executes the flight; and presenting the first target value, the first actual value, the second target value, and the second actual value simultaneously and together to an aircraft operator at a flight deck of the aircraft as the aircraft executes the flight.

2. The method of claim 1 wherein providing the first target value and the first actual value includes providing the first target value and the first actual value in a printable electronic file.

3. The method of claim 1 wherein providing the at least one target value and the actual value includes providing the at least one target value and the actual value in a printout.

4. The method of claim 1 wherein providing the at least one target value and the actual value includes providing the at least one target value and the actual value in a computer-displayable file.

5. The method of claim 1 wherein providing the first target value and the first actual value includes providing the first target value and the first actual value to an aircraft flight data recorder.

6. The method of claim 1 wherein providing the at least one target value and the actual value includes providing the at least one target value and the actual value to a ground facility via a data link.

7. The method of claim 1 wherein providing the at least one target value and the actual value includes providing a graphical representation of the at least one target value and the actual value.

8. The method of claim 1 wherein providing the first target value and the first actual value includes providing an alphanumeric representation of the first target value and the first actual value in a tabular format.

9. The method of claim 1 wherein receiving the first information only includes receiving a target altitude.

10. The method of claim 1 wherein receiving the first information includes automatically receiving information uplinked from air traffic control.

11. The method of claim 1 wherein receiving the first information includes receiving information input by an operator of the aircraft via an input device.

12. The method of claim 1 wherein receiving the first information includes receiving information included as part of an aircraft flight plan.

13. The method of claim 1 wherein the target includes a target location on a target path, and wherein the method further comprises automatically receiving the second information when the aircraft intersects a line passing through the target location and oriented at least approximately perpendicular to an actual path.

14. The method of claim 1, further comprising:

displaying the first target value in a first manner; and displaying the first actual value in a second manner different than the first manner.

15. The method of claim 1 wherein the target value includes a target distribution of fuel usage as a function of distance traveled by the aircraft and wherein the actual value includes an actual distribution of fuel usage as a function of distance traveled by the aircraft, and wherein the method further comprises displaying the target distribution and the actual distribution graphically.

16. The method of claim 1, further comprising:

receiving fourth information corresponding to an aspect of the flight, the fourth information being input by an operator of the aircraft; and providing the fourth information along with the first target value and the first actual value in the common medium.

17. A computer-implemented method for collecting aircraft flight data, comprising:

receiving first information corresponding to a proposed flight plan, the first information including a plurality of targets to which an aircraft may be directed during flight, the plurality of targets having corresponding target values, the target values including a first target value and a second target value;

as the aircraft executes the flight, automatically receiving second information that includes actual values corresponding to the target values, the actual values including a first actual value received at a first time and corresponding to the first target value and a second actual value received at a second time and corresponding to the second target value; and establishing a stored record of the aircraft's flight by providing and storing the target values and the actual values together in a common computer-based medium for use after the aircraft executes the flight, and presenting the first target value, the first actual value, the second target value, and the second actual value simultaneously and together to an operator at a flight deck of the aircraft as the aircraft executes the flight.

18. The method of claim 17 wherein providing the target values and the actual values includes:

providing the target values and the actual values at a single display of the aircraft; and providing the target values and the actual values in a printable electronic file.

19. The method of claim 17 wherein providing the target values and the actual values includes providing a graphical representation of the target values and the actual values.

20. The method of claim 17 wherein receiving the first information only includes receiving a target altitude.

21. The method of claim 17 wherein the target includes a target location on a target path, and wherein the method further comprises automatically receiving the second information when the aircraft intersects at a right angle a line passing through the target location.

22. The method of claim 17, further comprising:

displaying the first target value in a first manner; and displaying the first actual value in a second manner different than the first manner.

23. The method of claim 17 wherein the target value includes a target distribution of fuel usage as a function of distance traveled by the aircraft and wherein the actual value includes an actual distribution of fuel usage as a function of distance traveled by the aircraft, and wherein the method further comprises displaying the target distribution and the actual distribution graphically.

24. The method of claim 17, further comprising:

receiving third information corresponding to an aspect of the flight, the third information being input by an operator of the aircraft; and providing the third information along with the target value and the actual value in the common medium.

25. A system for collecting aircraft flight data, comprising:

first receiving means for receiving first information corresponding to a proposed aspect of a flight of the aircraft, the first information including a first target value and a second target value;

second receiving means for automatically receiving at a first time second information as the aircraft executes the flight, the second information including a first actual value corresponding to the first target value, the second receiving means further automatically receiving at a second time third information as the aircraft executes the flight, the third information including a second actual value corresponding to the second target value;

assembly means for establishing a stored record of the aircraft's flight by providing and storing the first target value, the first actual value, the second target value, and the second actual value together in a common computer-based medium for use after the aircraft executes the flight; and means for presenting the first target value, the first actual value, the second target value, and the second actual value simultaneously and together to an aircraft operator at a flight deck of the aircraft as the aircraft executes the flight.

26. The system of claim 25 wherein the first receiving means, the second receiving means and the assembly means include portions of one or more computer processors.

27. The system of claim 25, further comprising output means for outputting the first target value and the first actual value, the output means being operatively coupled to the assembly means.

28. A computer-implemented method for collecting aircraft flight data, comprising:

receiving flight plan information corresponding to a proposed aspect of a flight of the aircraft, the flight plan information including a first target value and a second target value;

as the aircraft executes the flight, automatically receiving at a first time first actual flight information that includes a first actual value corresponding to the first target value;

as the aircraft executes the flight, automatically receiving at a second time second actual flight information that includes a second actual value corresponding to the second target value;

establishing a stored record of the aircraft's flight by providing and storing the first target value and the first actual value together in a common computer-based medium;

providing and storing the second target value and the second actual value together in the common computer-based medium:

displaying the first target value, the first actual value, the second target value, and the second actual value simultaneously and together at a display portion of the aircraft to an operator of the aircraft; and providing the first target value, the first actual value, the second target value, and the second actual value together in a printable computer file for use after the aircraft executes the flight.

29. A computer-implemented method for collecting aircraft flight data, comprising:

receiving first information corresponding to a proposed aspect of a flight of the aircraft, the first information including a first target value and a second target value;

as the aircraft executes the flight, automatically receiving at a first time second information that includes a first actual value corresponding to the first target value;

as the aircraft executes the flight, automatically receiving at a second time third information that includes a second actual value corresponding to the second target value;

establishing a stored record of the aircraft's flight by providing and storing the first target value and the first actual value together in a common computer-based medium for use after the aircraft executes the flight;

establishing a stored record of the aircraft's flight by providing and storing the second target value and the second actual value together in the common computer-based medium for use after the aircraft executes the flight; and presenting the first target value, the first actual value, the second target value, and the second actual value to an aircraft operator at a flight deck of the aircraft.

30. The method of claim 29 wherein presenting includes presenting the first target value and the first actual value together in a tabular format.

* * * * *

UNITED STATES PATENT AND TRADEMARK OFFICE

CERTIFICATE OF CORRECTION

PATENT NO. : 7,577,501 B2
APPLICATION NO. : 10/787644
DATED : August 18, 2009
INVENTOR(S) : William D. Tafs et al.

It is certified that error appears in the above-identified patent and that said Letters Patent is hereby corrected as shown below:

On the Title page, Item (56), in column 2, under "Other Publications", line 1, delete "Writtten" and insert -- Written --, therefor.

In column 1, line 22, delete "preflight" and insert -- pre-flight --, therefor.

In column 1, line 23, delete "preflight" and insert -- pre-flight --, therefor.

In column 11, line 18, in Claim 28, delete "medium:" and insert -- medium; --, therefor.

Signed and Sealed this

Twentieth Day of July, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,577,501 B2
APPLICATION NO. : 10/787644
DATED : August 18, 2009
INVENTOR(S) : Tafs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

Signed and Sealed this

Seventh Day of September, 2010

David J. Kappos

*Director of the United States Patent and Trademark Office*